US005773763A

United States Patent [19]
Stachulla

[11] Patent Number: 5,773,763
[45] Date of Patent: Jun. 30, 1998

[54] MOUNTING DEVICE FOR COMMUNICATION RJ ELEMENTS (PATCH PANEL) WHICH HAS A REAR CABLE GUIDE STRIP AND A FRONT CABLE GUIDE RING

[75] Inventor: Peter Stachulla, Cheltenham, Great Britain

[73] Assignee: Krone Aktiengesellschaft, Berlin-Zehlendorf, Germany

[21] Appl. No.: 535,775

[22] Filed: Sep. 28, 1995

[30] Foreign Application Priority Data

Nov. 3, 1994 [DE] Germany ................ 44 40 455.7

[51] Int. Cl.[6] .................................................. H01B 7/00
[52] U.S. Cl. .................. 174/135; 439/540.1; 361/826
[58] Field of Search ................ 439/49, 532, 540.1,
439/719, 135; 174/60, 64, 66, 67; 361/826,
827, 828; 379/326, 327, 332; 385/134

[56] References Cited

U.S. PATENT DOCUMENTS

| D. 299,492 | 1/1989 | Gregson ........................... D14/240 |
| 4,278,315 | 7/1981 | Osborne ............................. 439/491 |
| 4,353,614 | 10/1982 | Etchinson et al. ............... 439/540.1 |
| 4,752,107 | 6/1988 | Gunell et al. ..................... 439/709 |
| 4,808,116 | 2/1989 | Unger et al. ....................... 439/94 |
| 4,955,829 | 9/1990 | Marks et al. ...................... 439/719 |
| 5,145,380 | 9/1992 | Holcomb et al. .................. 439/49 |
| 5,161,988 | 11/1992 | Krupka ............................. 439/136 |
| 5,366,388 | 11/1994 | Freeman et al. ................ 439/540.1 |
| 5,460,541 | 10/1995 | Weatherley ....................... 439/532 |
| 5,668,910 | 9/1997 | Arnett ............................... 385/134 |

FOREIGN PATENT DOCUMENTS

| 0 575 072 A1 | 12/1993 | European Pat. Off. . |
| 0 601 290 A2 | 6/1994 | European Pat. Off. . |
| 0 647 003 A1 | 4/1995 | European Pat. Off. . |
| 42 04 558 A1 | 8/1993 | Germany . |

*Primary Examiner*—Kristine L. Kincaid
*Assistant Examiner*—Kamand Cuneo
*Attorney, Agent, or Firm*—McGlew and Tuttle

[57] ABSTRACT

A mounting device for communication voice/data RJ connection elements (patch panel). A simple, quick, reliable and flexible placement of RJ connection elements and the wiring thereof is achieved with a mounting panel with receiving portions and with recesses, in which the RJ connection elements are immediately placed. A rear-side cable guiding portion spatially corresponding to the respective receiving portions.

The rear-side cable guiding portion rotates between a swung-in and a swung-out position to allow access to the cables. The mounting device also has a cable guiding ring attached to the front side.

13 Claims, 6 Drawing Sheets

MOUNTING DEVICE FOR COMMUNICATION RJ ELEMENTS (PATCH PANEL) WHICH HAS A REAR CABLE GUIDE STRIP AND A FRONT CABLE GUIDE RING

FIELD OF THE INVENTION

The present invention relates to a mounting device for RJ connection elements, and more particularly to a patch panel for communication voice/data RJ connection elements.

BACKGROUND OF THE INVENTION

Mounting devices for RJ connection elements, such as RJ socket insets (RJ45 sockets) with insulation displacement contacts are used as patch panels for in house premises wiring. These are, e.g., employed in 19" distributor cabinets for voice/data communication. By means of the patch panels, a mechanical and/or electrical matching to the system interfaces is performed.

The prior art mounting devices for RJ connection elements are formed by a metal mounting frame into which there are placed the RJ connection elements. The mounting frame is connected by fixing holes with the rack of a 19" distributor cabinet. The cable layout is performed separately by patch panel guides not permitting, however, a direct assignment to the RJ sockets (see KRONE LINK with LSA Profile, Planning Instructions, edition 06.92).

SUMMARY AND OBJECTS OF THE INVENTION

It is therefore the object of the invention to develop a mounting device of the type referred to hereinbefore by means of which a simple, quick, reliable and flexible placement of RJ connection elements and the wiring thereof made possible.

According to the invention, a mounting device for RJ connection elements, such as voice/data communication RJ connection elements, is provided including a mounting panel with receiving portions and with recesses, the RJ connection elements being placed within the recesses. A rear-side cable guiding portion is provided spatially corresponding to the respective receiving portions.

The immediate placement of the RJ connection elements without any intermediate elements in the mounting device guarantees quick and easy mounting of, e.g., the RJ socket insets. Further, removal of the RJ connection elements from the front and rear sides is possible. By the immediate assignment of the cable guiding portion with the cable guiding channels to the receiving portions for the RJ connection elements, an immediate attachment of the supplied cables at the RJ connection element is possible, and thus a clear layout for wiring. The cable guiding portion is movable such that it comes out of the access area of the connection elements, but continues to guide the cables. The cable guiding portion can be brought into a position corresponding to the standard construction of 19" or ESTI distributor frames.

The rear-side cable guiding portion is preferably connected to the mounting panel and preferably comprises cable guiding channels wherein each cable guiding channel is disposed adjacent to one of the receiving portions. A front side cable guiding means may also be provided for guiding cable at a front side of the mounting panel. The front side cable guiding means preferably comprises a lateral cable guiding ring connected to the front side of the mounting panel. The lateral cable guiding ring is preferably provided in addition to an attachment of the mounting panel to a distributor frame.

The rear-side cable guiding portion and the lateral cable guiding ring are preferably connected to the mounting panel, and are removably disposed. The receiving portions preferably include clips for releasably holding the RJ connection elements. The mounting panel is preferably formed of plastic which may be provided as a shell or the like. Reinforcing structure may be provided connected to the shell. The reinforcing structure may be in the form of a metal rail or plastic rail or gas filling.

While a specific embodiment of the invention has been shown and described in detail to illustrate the application of the principles of the invention, it will be understood that the invention may be embodied otherwise without departing from such principles.

DETAILED DESCRIPTION OF THE PREFERRED EMBODIMENT

Figure 1:
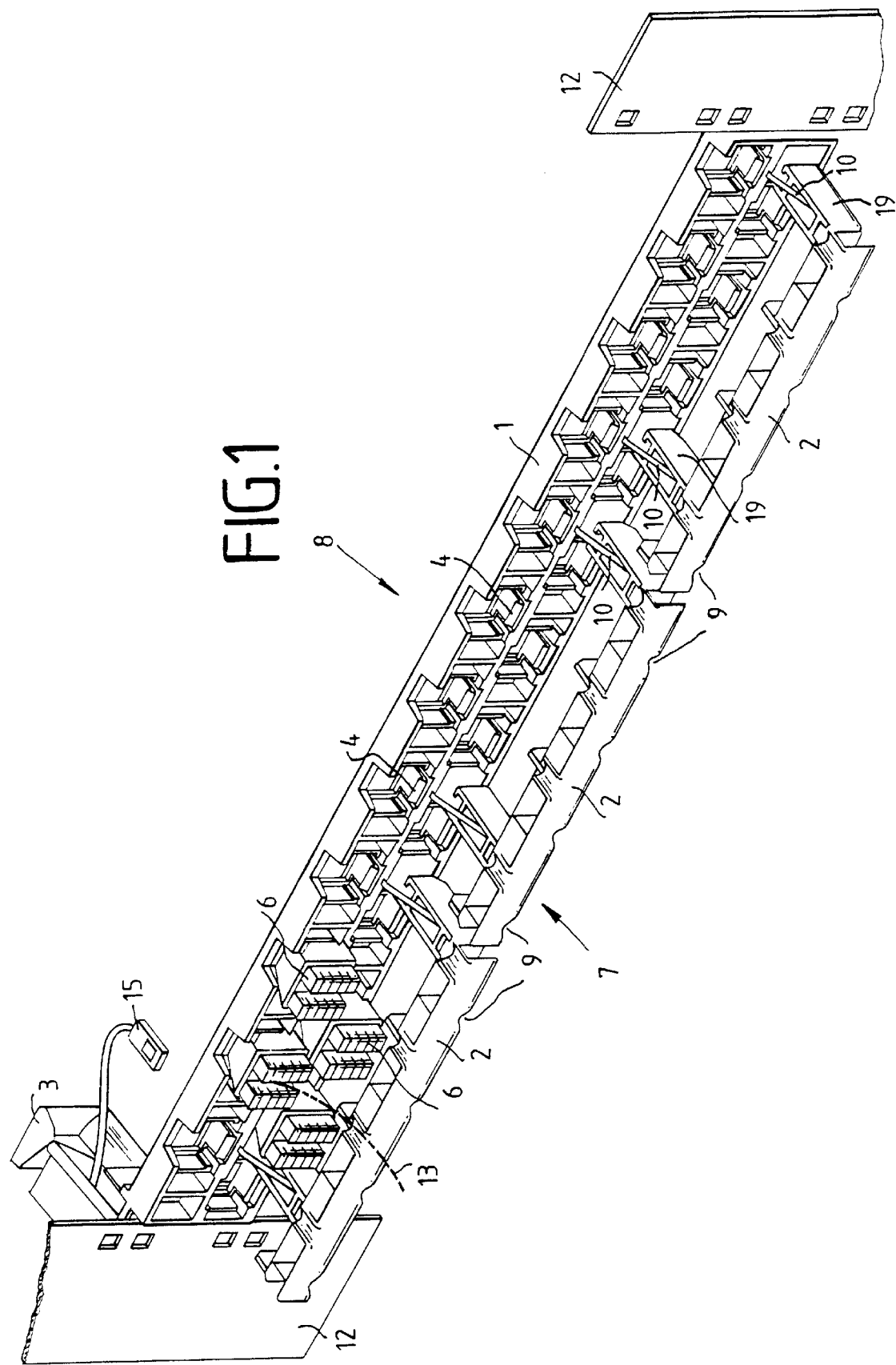
FIG. 1 is a perspective representation of the mounting device seen from behind.
Figure 5:
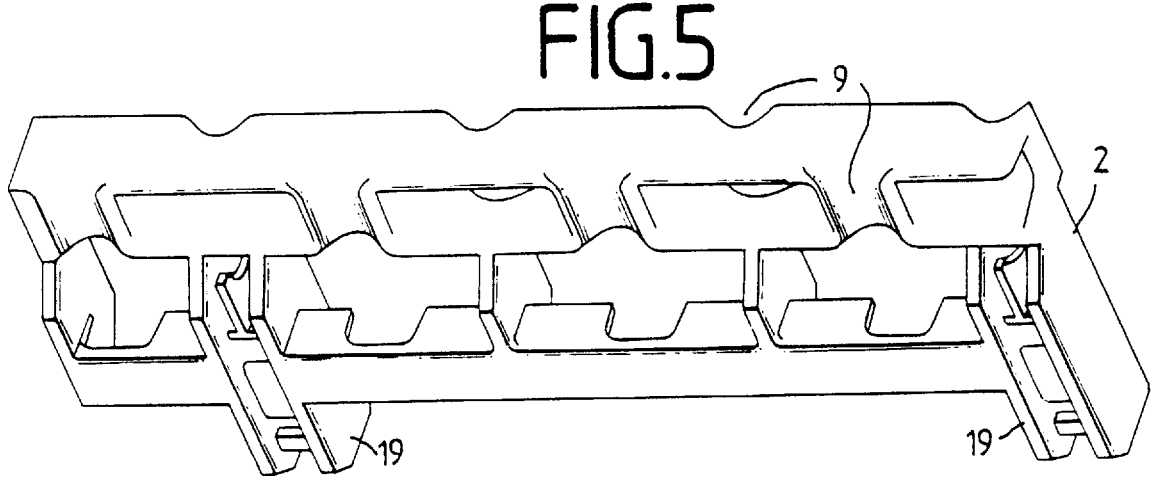
FIG. 5 is a perspective top view of the cable guiding portion.
Figure 6:
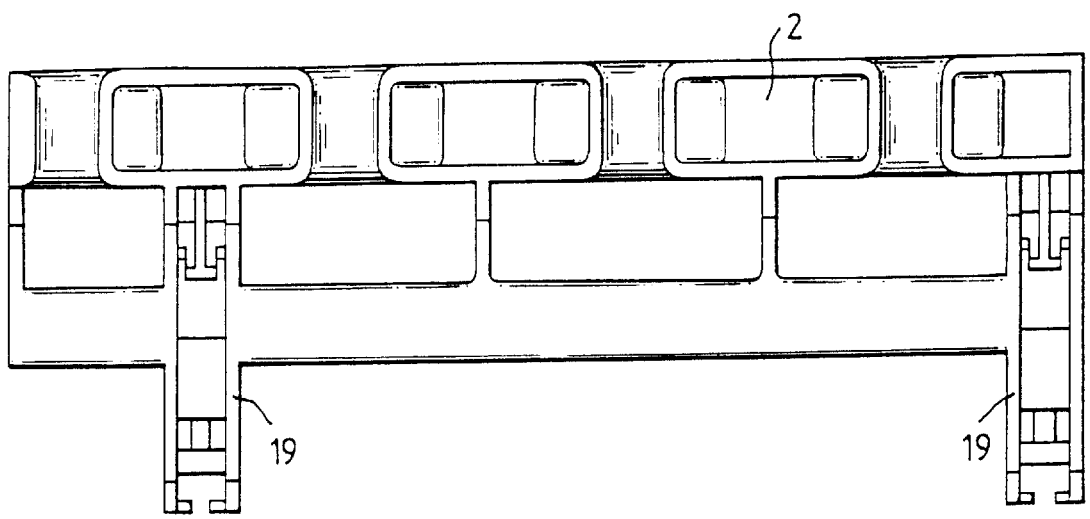
FIG. 6 is a front view of the cable guiding portion of FIG. 5.
Figure 7:
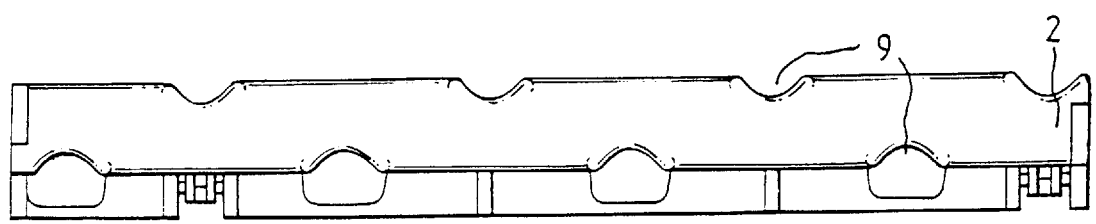
FIG. 7 is a top view of the cable guiding portion of FIG. 5.
Figure 8:
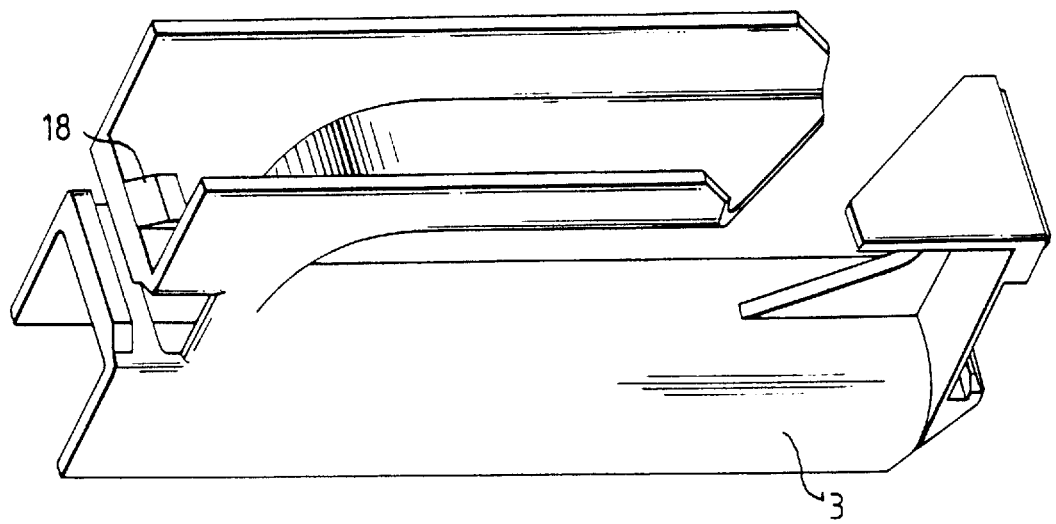
FIG. 8 is a perspective representation of the lateral cable guiding ring.

The mounting device (patch panel) is substantially formed according to FIG. 1 of a mounting panel 1 of plastic for RJ connection elements 6, of a rearside cable guiding portion 2 movable on the mounting panel 1 (FIGS. 5 to 7) and of a front-side, lateral cable guiding ring 3 (FIG. 8) simultaneously serving for attachment of the mounting panel 1 to a 19" or ESTI distributor frame 12. The lateral cable guiding ring 3 can also be configured to provide without using the guiding portion 2 front-side cable guiding only. The mounting panel 1 thus forms the actual patch panel.

Figure 2:
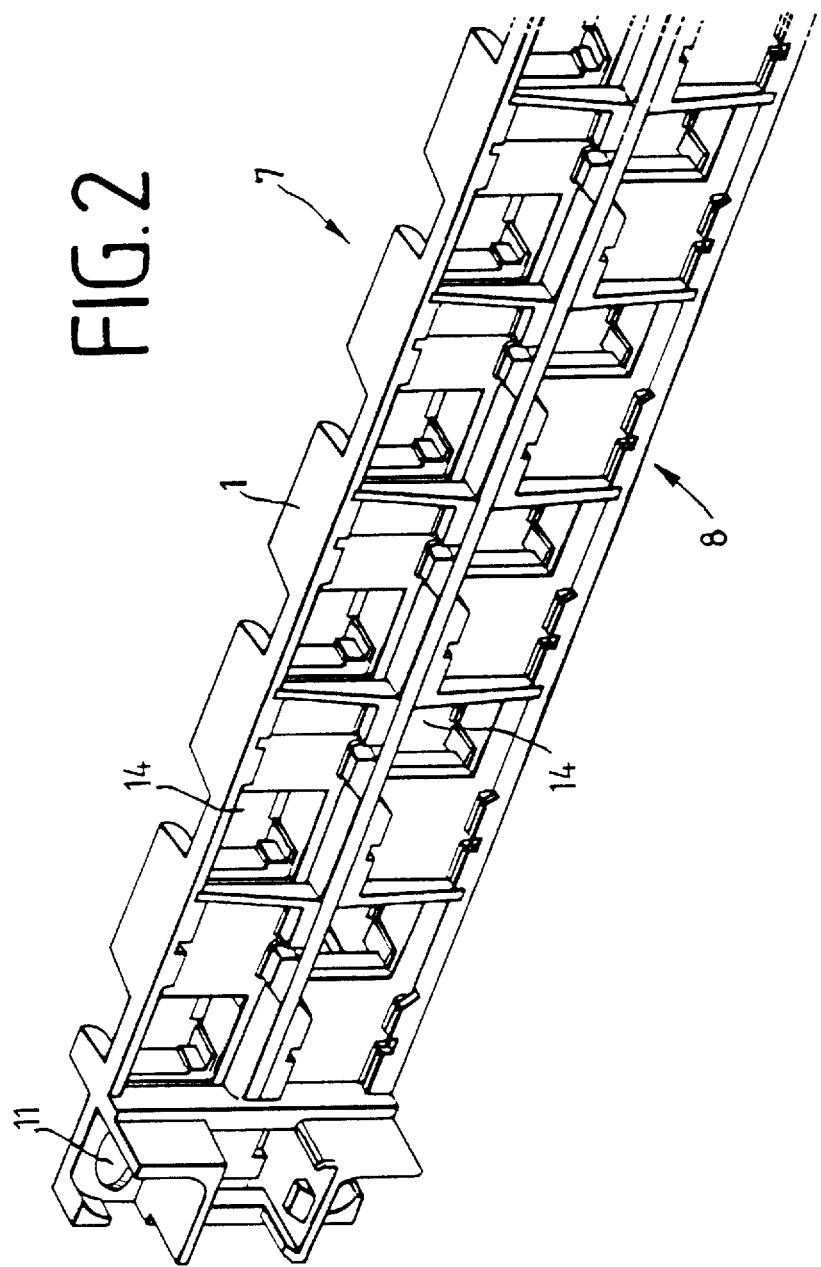
FIG. 2 is a perspective partial view of the front side of the mounting panel of FIG. 1
Figure 3:
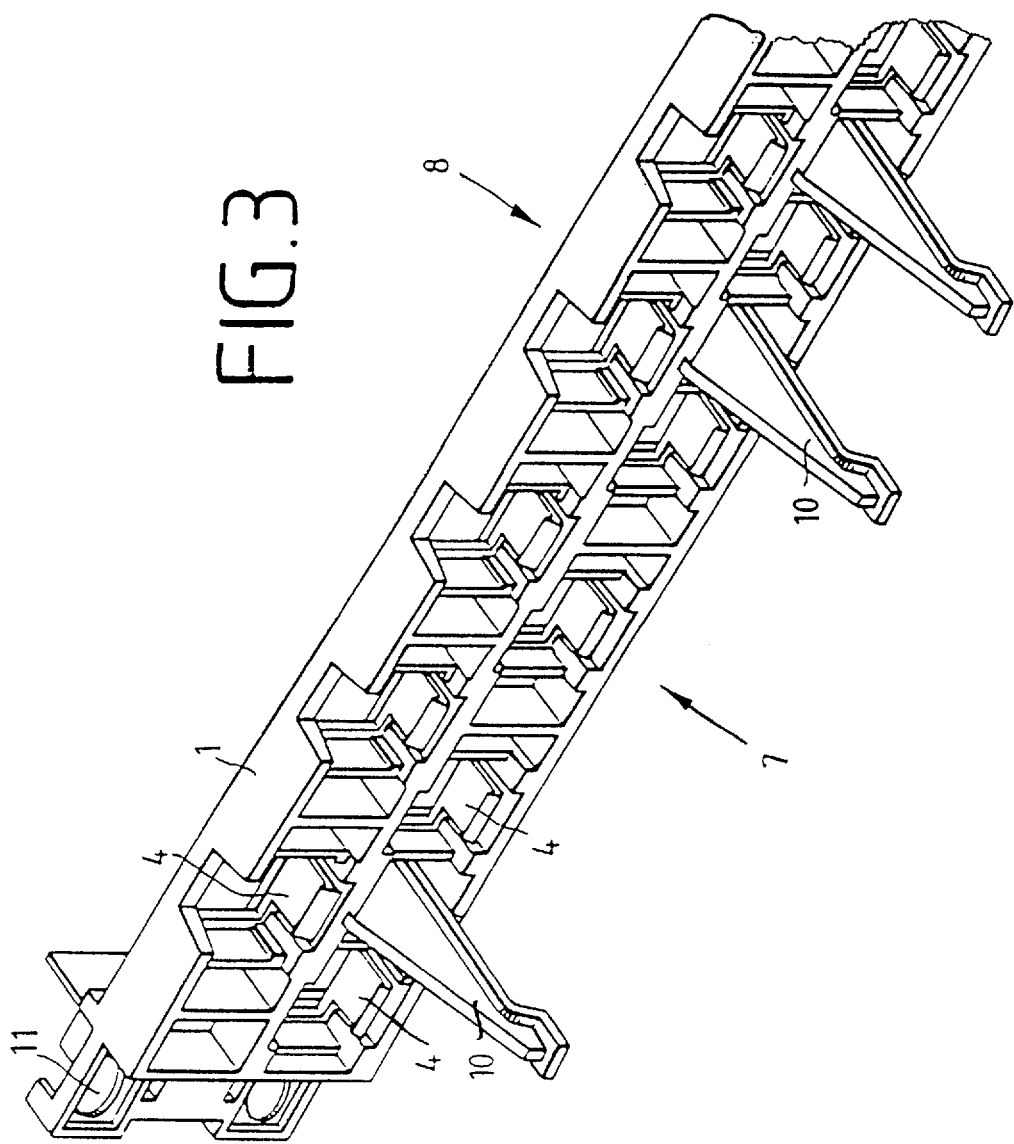
FIG. 3 is a perspective partial view of the rear side of the mounting panel of FIG. 1.
Figure 4:
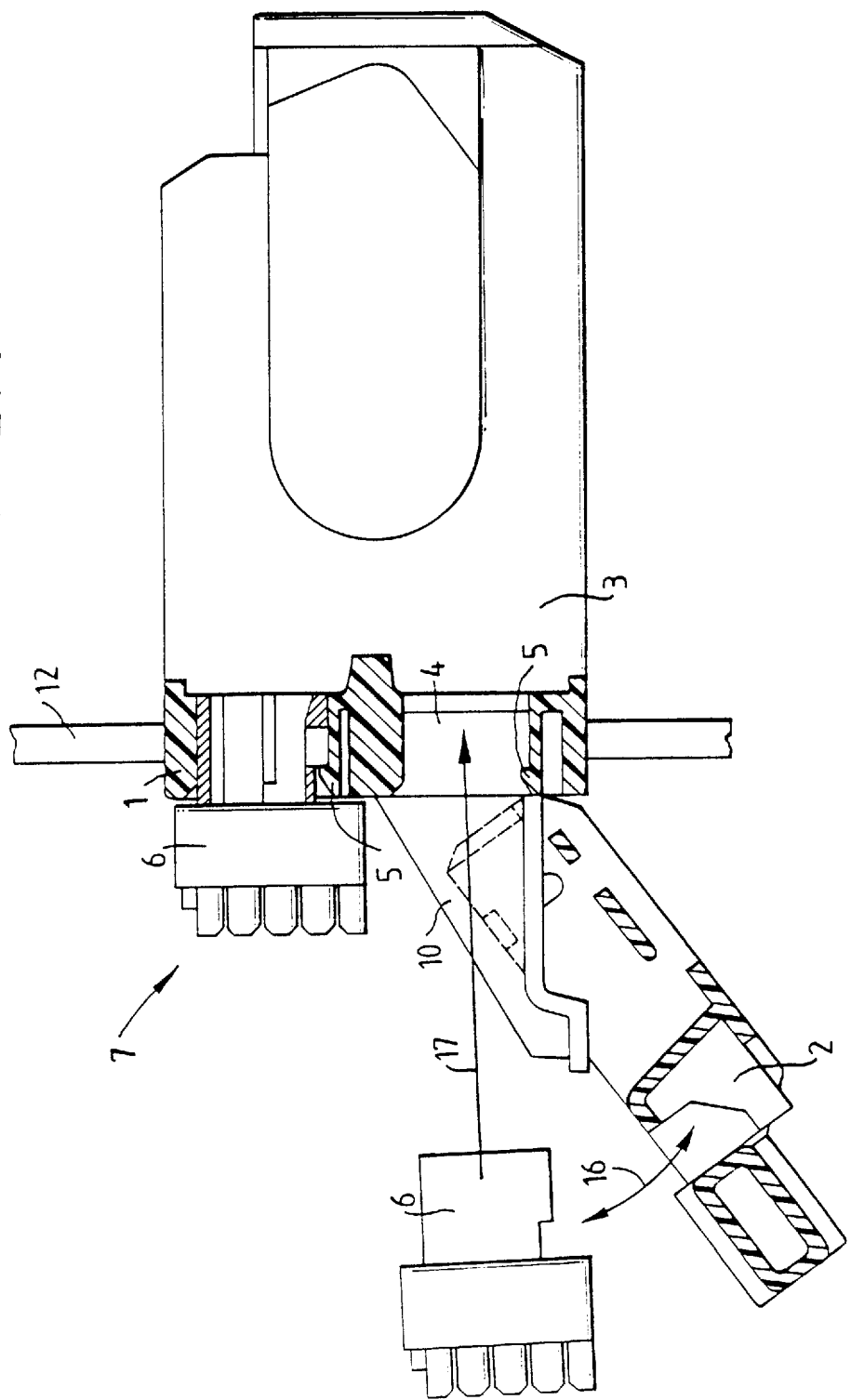
FIG. 4 is a partially sectional side view of the mounting panel of FIG. 1.

FIGS. 2 to 4 show various sectional views of the mounting panel 1 for mounting the RJ connection elements 6.

According to the representation in FIGS. 1, 3 and 4, the RJ connection elements 6 are detachably latched from the rear side 7 of the mounting panel 1 (FIG. 4) over latch connections 5 in receiving portions 4 in the direction of the arrow 17. The latch connections 5 are for instance formed by clips (FIG. 4). The RJ connection elements 6 can conductively be connected over at least two points to a not shown grounding plate. From the front side 8 of the mounting panel 1 (FIGS. 1, 2), the respective RJ plugs 15 (FIG. 1) can be inserted through the recesses 14 (FIG. 2) into the RJ connection elements 6, e.g. RJ45 sockets. The RJ connection elements include for example insulation displacement contacts on one side and an RJ socket on the other side.

The mounting panel 1 has according to FIG. 1 a plurality of receiving portions 4, in particular twenty-four receiving portions 4 for twenty-four RJ connection elements 6. Each receiving portion 4 of the mounting panel 1 is coupled to a cable guiding channel 9 of the cable guiding portion 2 such that a proper cable guiding can be performed from the terminals of the RJ connection elements 6. The cable guiding portions 2 are placed on the rear side 7 of the mounting panel 1 (FIG. 3) by latch lugs 10 of the mounting panel 1 and by lug receiving portions 19 (FIG. 6) at the cable guiding portions 2 (FIGS. 1, 4). At the cable guiding portions 2 there are attached the cables 13. Each cable 13 may be guided from the guiding portion 2 to the RJ connection elements 6 and fixed by a ribbon (not shown). The cable guiding portion 2 according to this embodiment is intended for eight cables 13, so that for the described mounting panel 1 for the twenty-four RJ connection elements 6 three cable guiding portions 2 are installed (FIG. 1).

Referring to FIG. 4, the cable guiding portion 2 is movable in the direction of the arrow 16 such that it comes out of the access area of the RJ connection elements 6. Even in this swung-out position the cable guiding portion 2 guides the cables 13 to the RJ connection elements 6. The cable guiding portion 2 can be swung in so far that it does not come higher than the standard height of the distributor frame 12.

The guiding ring 3 is connected to mounting panel 1 on the frame 12. The connection may be at the 19" or the ESTI distributor frame 12 or the like. The lateral cable guiding ring 3 is movably supported, movable within a range of 45° in the cutout 11 (FIGS. 2, 3) on the front side 8 of the mounting panel 1. It has mainly the function of front-side cable guiding. According to the present example, it additionally serves for attachment of the mounting panel 1 at the distributor frame 12 wherein a latch element 18 of the guiding ring 3 engages through the mounting panel 1 into cutouts of the frame 12. According to the representation in FIG. 8, the lateral cable guiding ring 3 is so configured for this purpose that it can firmly be snap-fitted by the latch device 18 in the mounting panel 1 and serves for the lateral guiding of the RJ45 plug cables on the front side 8 of the mounting device.

The mounting panel 1 (patch panel) is made from plastic and has a reinforcement by a plastic or metal rail or by a gas filling.

While a specific embodiment of the invention has been shown and described in detail to illustrate the application of the principles of the invention, it will be understood that the invention may be embodied otherwise without departing from such principles.

What is claimed is:

1. A mounting device for voice/data communication RJ connection elements, comprising:

a mounting panel having a front side and a rear side and having receiving portions adjacent to recesses defined in said mounting panel, said recesses each defining a space for one of the RJ connection elements; and a rear-side cable guiding portion removably connected to said rear side of said mounting panel at a location corresponding to said receiving portions, said rear-side cable guiding portion being supported by said mounting panel movably between a swung in position and a swung out position, spaced from said swung in position; and front-side cable guiding means, connected to said mounting panel front side for guiding cable at said front side of said mounting panel, said front-side cable guiding means comprising a lateral cable guiding ring removably connected to said front side of said mounting panel.

2. A mounting device according to claim 1, wherein said rear-side cable guiding portion is connected to said mounting panel and comprises cable guiding channels, each of said cable guiding channels being disposed adjacent to one of said receiving portions.

3. A mounting device according to claim 1, wherein said front-side cable guiding means is connected to said mounting panel adjacent to one of said receiving portions.

4. A mounting device according to claim 1, wherein said receiving portions include clips for releasably holding said RJ connection elements.

5. A mounting device according to claim 1, wherein said mounting panel is formed of plastic material.

6. A mounting device according to claim 5, wherein said reinforcement means is provided as reinforcing plastic filling said mounting panel.

7. A mounting device according to claim 5, wherein said mounting panel plastic material is provided with reinforcement means for reinforcing said plastic material.

8. A mounting device according to claim 7, wherein said reinforcement means is provided as a metal rail, said metal rail for reinforcing said mounting panel.

9. A mounting device according to claim 7, wherein said reinforcement means is provided as a plastic rail, said plastic rail for reinforcing said mounting panel.

10. A mounting device for voice/data communication RJ connection elements, comprising:

a mounting panel having a front side and a rear side and having receiving portions adjacent to recesses defined in said mounting panel, said recesses defining a space for the RJ connection elements;

a rear-side cable guiding portion removably connected to said rear side of said mounting panel at a location corresponding to said receiving portions, said mounting panel including latch lug means and said rear side cable guiding portion including latch lug receiving means, said latch lug means and said latch lug receiving means cooperating for supporting said rear side cable guiding portion in a first position, connected to said mounting panel and supporting said rear side cable guiding portion in a swung out position, from said first position, connected to said mounting panel; and front-side cable guiding means connected to said front side for guiding cables at the front side of said mounting panel, said front-side cable guiding means comprising a lateral cable guiding ring removably connected to said front side of said mounting panel.

11. A mounting device according to claim 10, wherein said rear-side cable guiding portion comprises cable guiding channels, each of said cable guiding channels being disposed adjacent to one of said receiving portions.

12. A mounting device for voice/data communication RJ connection elements, comprising:

a mounting panel having a front side and a rear side and having receiving portions adjacent to recesses defined in said mounting panel, said recesses defining a space for the RJ connection elements;

a rear-side cable guiding portion removably connected to said rear side of said mounting panel at a location corresponding to said receiving portions, said mounting panel including latch lug means and said rear side cable guiding portion including latch lug receiving means, said latch lug means and said latch lug receiving means cooperating for supporting said rear side cable guiding portion in a first position connected to said mounting panel and supporting said rear side cable guiding portion in a swung out position, from said first position, connected to said mounting panel wherein a range of movement of said rear-side cable guiding means between said first position and said swung out position is 45°; and front-side cable guiding means for guiding cables at the front side of said mounting panel, said front-side cable guiding means comprising a lateral cable guiding ring removably connected to said front side of said mounting panel.

13. A mounting device according to claim 12, wherein said rear-side cable guiding portion comprises cable guiding channels, each of said cable guiding channels being disposed adjacent to one of said receiving portions.

* * * * *